United States Patent

Fayolle

[11] 4,346,208
[45] Aug. 24, 1982

[54] ANISOTROPIC MELTS WHICH CAN BE SHAPED, BASED ON AROMATIC POLYESTERS, AND ARTICLES FORMED FROM THESE MELTS

[75] Inventor: Bernard Fayolle, Ecully, France

[73] Assignee: Rhone-Poulenc Industries, Paris, France

[21] Appl. No.: 186,289

[22] Filed: Sep. 11, 1980

[30] Foreign Application Priority Data

Sep. 21, 1979 [FR] France .................................. 79 24135

[51] Int. Cl.$^3$ ..................... C08G 63/18; C08G 63/40
[52] U.S. Cl. ............................ 528/176; 264/331.11; 528/191; 528/193; 528/194
[58] Field of Search ............... 528/176, 191, 193, 194, 528/206, 209, 219

[56] References Cited

U.S. PATENT DOCUMENTS

| | | | |
|---|---|---|---|
| 3,873,504 | 3/1975 | Boettcher et al. | 528/191 |
| 3,991,013 | 11/1976 | Pletcher | 528/191 |
| 3,991,014 | 11/1976 | Kleinschuster | 260/47 C |
| 4,065,432 | 12/1977 | Frazer | 528/176 |
| 4,156,070 | 5/1979 | Jackson et al. | 528/191 |

FOREIGN PATENT DOCUMENTS

| | | |
|---|---|---|
| 1795502 | 2/1972 | Fed. Rep. of Germany . |
| 989552 | 4/1965 | United Kingdom . |
| 1093377 | 11/1967 | United Kingdom . |

*Primary Examiner*—H. S. Cockeram

*Attorney, Agent, or Firm*—Stevens, Davis, Miller & Mosher

[57] ABSTRACT

Anisotropic melts are disclosed which can be shaped, based on aromatic polyesters containing linkages of the arylaliphatic ether type.

These melts consist of homopolyesters having units of the formulae:

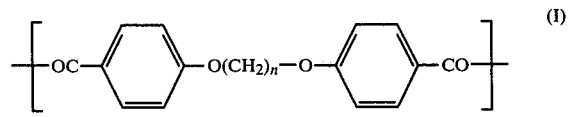

and

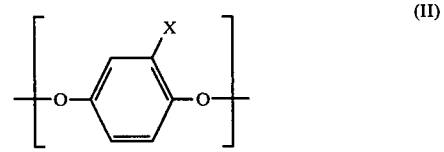

in which n equals 4 or 6 and X=H, Cl or CH$_3$, with the proviso that when n equals 4, X only represents Cl or CH$_3$, the flow points of these polymers being between 200° and 340° C. These anisotropic melts make it possible to obtain filaments, films and molded articles possessing good mechanical properties.

9 Claims, No Drawings

ANISOTROPIC MELTS WHICH CAN BE SHAPED, BASED ON AROMATIC POLYESTERS, AND ARTICLES FORMED FROM THESE MELTS

The present invention relates to anisotropic melts which can be shaped, based on aromatic polyesters containing linkages of the arylaliphatic ether type, as well as processes for obtaining the anisotropic molten masses.

It also relates to the articles produced from these melts, such as, in particular, filaments, fibers, films or molded articles, which are shaped from the mesophase of the said melts.

It is known from French Application No. 2,270,282 to prepare polyesters comprising residues of one or more diphenols and of one or more aromatic and/or cycloaliphatic dicarboxylic acids, which polyesters are capable of forming, by fusion, anisotropic melts from which oriented filaments can be formed by extrusion in the molten state. Homopolyesters prepared from a dicarboxylic acid containing two aromatic nuclei joined by an aliphatic chain containing four or more atoms are excluded from the field referred to by said French application. There are grounds for supposing that the reason for this exclusion lies in the fact that, in the molten state, the above-mentioned homopolyesters must have a conversion temperature which is too close to the degradation temperature, so that extrusion in the molten state is rendered difficult or even impossible. The expression "conversion temperature" is explained in greater detail below.

British Pat. No. 989,552 describes homopolyesters derived from diphenols and from 1,2-(p,p'-di-carboxydiphenoxy)-ethane. These homopolyesters are prepared from a diacid containing two aromatic nuclei joined by an aliphatic chain containing four atoms. The anisotropy of these particular homopolyesters in the molten state does not seem to have been established, and it is noted that compounds of this type have flow points above 350° C., that is to say very close to the degradation temperature of these polyesters. This information provides support for the idea that homopolyesters derived from a dicarboxylic acid containing two aromatic nuclei joined by an aliphatic chain containing four or more atoms are not suitable for carrying out conversions in the molten state, leading to shaped articles.

Pursuing research in this field of the art, in accordance with the present invention it has now been found, surprisingly, that it is possible to prepare melts produced from homopolyesters derived from diphenols and from dicarboxylic acids containing two aromatic nuclei joined by an aliphatic chain containing more than four atoms, which melts are anisotropic and have a range of conversion temperatures which are sufficiently below the degradation temperature of the polyesters to permit easy shaping.

More precisely, the present invention relates to anisotropic melts which can be shaped, based on aromatic polyesters, characterized in that they are prepared by fusion of homopolyesters possessing the following characteristics:

they consist or consist essentially of repeat units of the formulae:

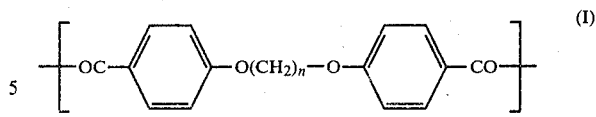

and

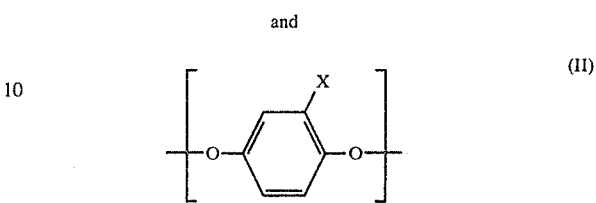

in which:
  $n=4$ and x represents a methyl group or a chlorine atom, or
  $n=6$ and X represents a hydrogen atom, a methyl group or a chlorine atom; and
  they have flow points between 200° and 340° C.

The present invention also relates to the shaped articles obtained from such anisotropic melts.

The anisotropy of the melts according to the present invention can be demonstrated when the polyesters in the molten state are observed in optical systems equipped with crossed polarisers; transmission of the polarised light occurs and a strong birefringence is created, whereas the transmission of the light and the birefringence are zero for isotropic products observed in polarised light.

The anisotropy of the melts according to the present invention was demonstrated by the TOT thermo-optical method described in the aforesaid French Application No. 2,270,282.

Thus, the melts possess an inherent orientation and a relatively high degree of organization, which are found again in the shaped articles, such as, for example, filaments, films and molded articles, and which impart thereto, even in the crude state, good mechanical properties which are not usually observed in crude isotropic products.

The anisotropic melts according to the present invention consist of or consist essentially of homopolyesters having units of the formula:

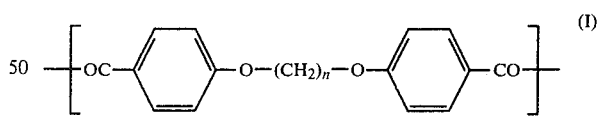

which are the residues of dicarboxylic acids, or derivatives thereof in which $n=4$ or 6, and units of the formula:

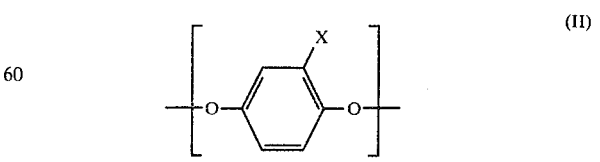

which are produced from diphenols, or derivatives thereof, in which $X=H$, Cl or $CH_3$, with the proviso that if $n=4$, X only represents a methyl group or a chlorine atom.

The homopolyesters from which the anisotropic melts according to the present invention are derived by fusion have flow points between 200° and 340° C. Preferably, these flow points are between 250° and 300° C.

The expression "flow points" is understood as meaning the temperature at which the edges of a sample, in the form of a polymer chip or chopped fiber, start to become rounded. This temperature is determined by visual observation of the sample on a cover glass placed between crossed polarisers (90° C.), for a suitable rate of temperature increase which is generally of the order of 10° and 20° C./minute, on a microscope, equipped with a heating stage, known commercially under the trademark "THERMOPAN" and manufactured by REICHERT.

The polymers constituting the melts according to the present invention are insoluble in the usual solvents for polyesters, in particular the solvents used for measuring the inherent viscosity of such products. It is for this reason that it was not possible to determine the inherent viscosity in this case. The following may be mentioned amongst the solvents so tested: p-chlorophenol; a mixture of parachlorophenol and 1,2-dichloroethane trifluoroacetic acid, by itself or mixed with conventional chlorinated solvents; dichloroacetic acid; ortho-cresol; orthochlorophenol; meta-cresol; and tetrachloroethane.

It should be noted that the melts in the anisotropic state, according to the present invention, have ranges of conversion temperatures spread over at least 30 centigrade degrees.

The expression "range of conversion temperatures" is understood as meaning the temperature zone which starts from the flow point of the polyester and which is located above the said point, and within which the melt is anisotropic and can easily be shaped without any risk of decomposition of the polyester.

The thermotropic homopolyesters from which the anisotropic melts are derived by fusion can advantageously be obtained by means of an acidolysis reaction, that is to say by the reaction, in approximately stoichiometric proportions, of a diester of a diphenol of the formula:

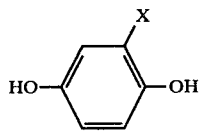

such as the diesters of an alkanoic acid containing from 2 to 6 carbon atoms (preferably the diacetate), with a dicarboxylic acid of the formula:

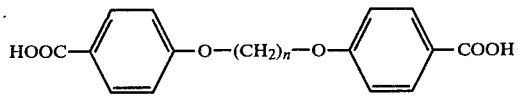

in which formulae X and n have the meanings indicated above, if desired in the presence of catalysts chosen, in particular, from amongst salts of sodium, potassium, magnesium or calcium derived from carboxylic acids.

The diphenol used can be hydroquinone, methylhydroquinone or chlorohydroquinone. If n=4, the diacid used is 1,4-(p,p'-dicarboxydiphenoxy)-butane. If n=6, the diacid is 1,6-(p,p'-dicarboxydiphenoxy)-hexane.

The reaction starts above 200° C. and the acid formed then distils whilst the temperature of the reaction mixture is raised above 280° C. When the distillation of the acid is virtually complete, the pressure is gradually reduced and the polycondensation is carried out under a high vacuum for at least 30 minutes.

The homopolyesters can also be obtained by reacting the free diphenol with a derivative of the dicarboxylic acid (in particular a dihalide such as the dichloride or a diaryl diester such as the diphenyl diester) in approximately stoichiometric proportions, generally in the presence of catalysts, such as those indicated in Canadian Pat. No. 735,543.

Finally, it is also possible to obtain the homopolyesters by direct esterification of the diphenol with the diacid, in the presence of known catalysts.

The anisotropic melts according to the present invention can be shaped by means of any known process, such as extrusion, film formation or molding, and by operating in the anisotropy phase, in order to give shaped articles having good properties.

More precisely, these shaped articles produced from homopolyesters (that is to say from compounds of simple chemical structure) possess mechanical characteristics, for example flexural strength, tensile strength and torsional modulus, which are at least as good as those of plastics reinforced by glass fibers. Moreover, these articles retain good properties as a function of temperature.

This is the case, for example, of injection-molded articles, which possess the following properties:

a flexural modulus of more than 200 daN/mm² (measured in accordance with French Standard Specification T 51,001), and a torsional modulus at 140° C. of at least 20 daN/mm² (measured in accordance with ISO Standard Specification R 537, method B).

Generally, they possess a flexural modulus of more than 400 daN/mm² and a torsional modulus of at least 50 daN/mm².

Other particularly valuable articles obtained from the anisotropic melts according to the present invention are the filaments which, immediately after extrusion, already possess a modulus of elasticity of at least 500 cN/tex and more generally at least 700 to 800 cN/tex.

In addition, it is possible further to improve the mechanical properties of these filaments by means of a heat treatment at an elevated temperature which is below the flow point of the polyester.

The following examples, in which the parts and percentages are understood to be by weight, unless otherwise stated, are given by way of indication, but without implying a limitation, in order still further to illustrate the invention.

EXAMPLE 1

143.2 parts of 1,6-(p,p'-dicarboxydiphenoxy)-hexane, 77.6 parts of hydroquinone diacetate, and 0.383 part of magnesium acetate are introduced into a polycondensation reactor.

The apparatus is purged with nitrogen and the reactor is heated by means of a metal bath. The acetic acid distils above 231° C. When about 60% of the theoretical amount of acid has distilled, the temperature of the reaction mixture is raised from 235° to 320° C. The pressure in the apparatus is reduced from 760 mm Hg to 2 mm Hg in the course of 20 minutes, and the temperature is maintained for 10 minutes at this reduced pressure.

The resulting polymer, which is of fibrillar appearance, is insoluble in the solvents tested (trifluoracetic acid, phenol, tetrachloroëthane, p-chlorophenol, and a mixture of p-chlorophenol and 1,2-dichloroethane). It has a flow point of 325° C.

The range of conversion temperature of the anisotropic melt produced from this polymer extends from 325° C. to more than 355° C.

The polymer is then dried for 48 hours at 80° C., in vacuo, before being extruded through a spinneret having 7 orifices of diameter 0.23 mm, each of these orifices being at a temperature of 325° C.

The resulting filaments, which have an overall gauge of 106 dtex, have an initial modulus of elasticity of 1123 cN/tex, a tensile strength of 15.5 cN/tex and an elongation of 1.8%.

They are then subjected to the following heat treatment:
from 23° C. to 250° C. in the course of 0.8 hour,
then at 250° C. for 1 hour,
from 250° C. to 270° C. in the course of 0.2 hour, and
at 270° C. for 0.3 hour.

| Gauge: | 100 dtex |
|---|---|
| Tensile strength: | 19.6 cN/tex |
| Elongation: | 3.1% |

Following this treatment, they are then heated for 0.3 hour at 286° C.:

| Gauge: | 100 dtex |
|---|---|
| Tensile strength | 24.5 cN/tex |
| Elongation: | 3% |
| and then for 1.55 hours at 286° C.: | |
| Gauge: | 110 dtex |
| Tensile strength: | 31.3 cN/tex |
| Elongation: | 3.2% |

EXAMPLE 2

93.6 parts of methylhydroquinone diacetate, 161.26 parts of 1,6-(p,p'-dicarboxydiphenoxy)-hexane, and 0.127 part of magnesium acetate are simultaneously introduced into a polycondensation reactor.

After purging with nitrogen, the reactor is heated by means of a metal bath set at 250° C. When the reaction mixture reaches 239° C., the acidolysis reaction starts, and the temperature is raised gradually to 295° C. in the course of one hour, whilst the weight of acetic acid distilled is 88.61% of the theoretical amount. The pressure is then gradually reduced from 760 to 0.7 mm Hg in the course of 30 minutes; the reaction mixture is kept for 1 hour at 295° C. under a pressure of 0.4 mm Hg. A total of 98.15% of the theoretical amount of acetic acid has distilled. The resulting polyester is run into a mixture of water and ice; it is fibrillar and insoluble. It has a flow point of 260° C.

The range of conversion temperatures of the anisotropic melt produced from this polyester extends from 260° C. up to about 345° C. at which temperature it starts to degrade. After grinding, the polyester is dried for 6 hours at 150° C. under a pressure of 1 mm Hg and then for 15 hours at 90° C. in vacuo.

It is injection-molded on a "KAP" press under a nitrogen atmosphere and under the following conditions:

| Test Pieces | Dimensions | Temperature | Pressure |
|---|---|---|---|
| Dumb-bells | 4 × 8.4 × 80 mm | 280°–290° C. | 7 kg/cm² of nitrogen |
| | 2 × 4.4 × 50 mm | 290° C. | 7 kg/cm² of nitrogen |
| Notched bars | thickness under notch: 2.7 mm | 280°–290° C. | 4 kg/cm² of nitrogen |

The results obtained are as follows:
Flexural properties:

| (on test-pieces) | |
|---|---|
| strength (daN/mm²): | 14.2 |
| modulus of elasticity at break (daN/mm²): | 452 |
| Tensile properties: | |
| (on dumb-bells) | |
| strength (daN/mm²): | 7.8 |
| elongation %: | 0.98 |
| modulus of elasticity at break (daN/mm²): | 809 |
| Charpy impact strength: | |
| (notched bars) | |
| dJ/cm² | 16.9 |
| Torsional modulus of elasticity at 140° C. | |
| (on test pieces) | |
| in daN/mm²: | 54 |

Thermogravimetric analysis
(temperature increase of 15° C./minute)
carried out on the polymer before molding:

| Temperature, °C. | Weight loss % |
|---|---|
| 410 | 1 |
| 415 | 2.5 |
| 420 | 5 |
| 440 | 16 |
| 460 | 31 |
| 480 | 50 |
| 500 | 63 |
| 600 | 75 |
| 700 | 78 |
| 800 | 80 |

EXAMPLE 3

102.88 parts of chlorohydroquinone diacetate, 148.64 parts of 1,4-(p,p'-dicarboxydiphenoxy)-butane, and 0.126 parts of magnesium acetate are introduced into a polycondensation reactor.

After purging with nitrogen, the reactor is heated by means of a metal bath set at 250° C.

The acidolysis reaction starts at 235° C. and the mixture is brought to 288° C. in the course of 1.25 hours. The proportion of acetic acid which has distilled is then 90.74% of the theoretical amount. The pressure is lowered to 0.7 mm Hg in the course of 30 minutes and the temperature of the mixture is kept at 295° C. for 35 minutes.

This yields 184 parts (93.15%) of a polymer which is insoluble in a mixture of p-chlorophenol and 1,2-dichloroethane.

The flow point of the polymer is 300° C.

The range of conversion temperatures of the melt produced from this polymer extends from 300° C. up to more than 355° C.

After grinding and drying the polymer in the manner indicated in Example 2, test-pieces are injection molded on a "KAP" press under the following conditions:

| Test Pieces | Dimensions | Temperature | Pressure |
|---|---|---|---|
| | 4 × 8.4 × 80 mm | 300° C. | 6 kg/cm² of nitrogen |

| | | | |
|---|---|---|---|
| Dumb bells | 2 × 4.4 × 50 mm | 300° C. | 6 kg/cm² of nitrogen |

The results are as follows:
Flexural properties:

| | |
|---|---|
| (on test-pieces) strength (daN/mm²): | 1.75 |
| modulus of elasticity at break (daN/mm²): | 257 |
| Tensile properties: | |
| (on dumb-bells) strength (daN/mm²): | 0.83 |
| Torsional modulus of elasticity at 140° C.: | |
| (on test-pieces) in daN/mm²: | 23 |

EXAMPLE 4

93.6 parts of methylhydroquinone diacetate, 148.64 parts of 1,4-(p,p'-dicarboxydiphenyl)-butane, and 0.121 part of magnesium acetate are introduced into a polycondensation reactor.

The acidolysis reaction starts at 258° C. and the reaction mixture is gradually brought to 300° C. in the course of 1 hour 25 minutes. The proportion of acetic acid which has distilled is 91.85% of the theoretical amount. The pressure is then reduced to 3 mm Hg in the course of 30 minutes; the temperature of the reaction mixture is raised to 310° C. and kept at this value for 25 minutes.

The resulting polymer, run into a bath of water and ice, is insoluble in a mixture of p-chlorophenol and 1,2-dichloroethane. It has a flow point of 320° C.

The range of conversion temperatures of the melt produced from this polyester extends from 320° C. to more than 355° C.

After grinding and drying under the conditions indicated in Example 2, it is injection-molded on a "KAP" press under the following conditions:

| Test pieces | Dimensions | Temperature | Pressure |
|---|---|---|---|
| | 4 × 8.4 × 80 mm | 340° C. | 6 kg/cm² of nitrogen |
| Dumb-bells | 2 × 4.4 × 50 mm | 340° C. | 6 kg/cm² of nitrogen |

Mechanical properties obtained:
Flexural properties:

| | |
|---|---|
| (on test pieces) strength (daN/mm²): | 3.87 |
| modulus of elasticity at break (daN/mm²): | 487 |
| Tensile properties: | |
| (on dumb-bells) strength (daN/mm²): | 2.5 |
| elongation %: | 0.37 |
| modulus of elasticity at break (daN/mm²): | 685 |
| Torsional modulus of elasticity at 140° C.: | |
| (on test-pieces) in daN/mm²: | 47 |

EXAMPLE 5

An identical polymer to that prepared in accordance with Example 1 is used, and this is dried for 6 hours at 150° C. under 1 mm Hg and then for 15 hours at 90° C. in vacuo.

It is injection-molded on a "KAP" press under the following conditions:

| Test pieces | Dimensions | Temperature | Pressure |
|---|---|---|---|
| | 4 × 8.4 × 80 mm | 300° C. | 6 kg/cm² of nitrogen |
| Dumb-bells | 2 × 4.4 × 50 mm | 300° C. | 6 kg/cm² of nitrogen |
| Notched bars | 4 × 6 × 50 mm | 340° C. | 6 kg/cm² of nitrogen |

Thickness under notch: 2.7 mm

Characteristics obtained:
Flexural properties:

| | |
|---|---|
| (on test pieces) strength (daN/mm²): | 2.97 |
| modulus of elasticity at break (daN/mm²): | 227 |
| Tensile measurements: | |
| (on dumb-bells) strength (daN/mm²): | 0.89 |
| elongation %: | 0.36 |
| modulus of elasticity at break (daN/mm²): | 275 |
| Charpy impact strength: | |
| (notched bars) in dJ/cm²: | 2.49 |
| Torsional modulus of elasticity at 140° C.: | |
| in daN/mm²: | 50 |

What is claimed is:

1. Anisotropic melts which can be shaped, based on aromatic polyesters, characterised in that they are prepared by fusion of a homopolyester possessing the following characteristics:

they consist essentially of repeat units of the formulae:

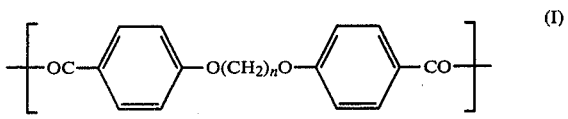 (I)

and

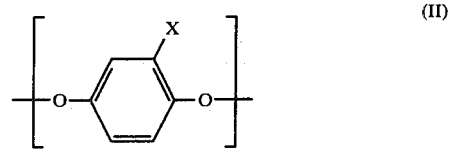 (II)

in which:
n = 4 and X represents a methyl group or a chlorine atom, or
n = 6 and X represents a hydrogen atom, a methyl group or a chlorine atom; and
they have flow points between 200° C. and 340° C.

2. Melts according to claim 1, characterised in that the homopolyesters have flow points between 250° and 300° C.

3. A process for the production of shaped articles, such as filaments, films and molded articles, by shaping anisotropic melts according to claim 1 or 2.

4. A process for the production of shaped articles according to claim 3, characterised in that the anisotropic melts possess ranges of conversion temperatures spread over at least 30 centigrade degrees.

5. Shaped articles, such as filaments, films and molded articles, when produced from the anisotropic melts according to claim 3 or 4.

6. Molded articles according to claim 5, characterised in that they possess a flexural modulus of more than 200 daN/mm² and a torsional modulus at 140° C. of at least 20 daN/mm².

7. Filaments according to claim 5, characterised in that they possess a modulus of elasticity of more than 500 cN/tex immediately after extrusion.

8. A process for the preparation of anisotropic molten masses according to claim 1 or 2, characterised in that homopolyesters are melted which have flow temperatures between 200° and 340° C., and which are obtained by reacting in substantially stoichiometric proportions:

(A)—a diester derived from (a) an alkanoic acid having from 2 to 6 carbon atoms and (b) a diphenol of the formula:

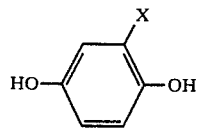

in which X represents an atom of hydrogen, a methyl group, or an atom of chlorine, with (B)—a dicarboxylic acid of formula:

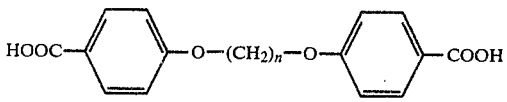

in which n equals 4 or 6 with the proviso that when n equals 4, X represents only a methyl group or an atom of chlorine.

9. A process for the preparation of anisotropic molten masses according to claim 1 or 2, characterised in that homopolyesters are melted which have flow temperatures between 200° and 340° C., and which are obtained by reacting, in substantially stoichiometric proportions: a diphenol of formula

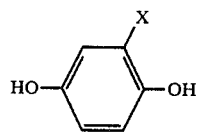

in which X represents a atom of hydrogen, a methyl group or an atom of chlorine with a diaryl dihalide or diester derived from an acid of formula:

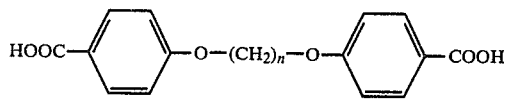

in which n equals 4 or 6 with the proviso that when n equals 4, X represents only a methyl group or a chlorine atom.

* * * * *